Sept. 6, 1932.  F. J. SPRAGUE  1,876,032
APPARATUS FOR CONTROLLING MOVEMENT OF VEHICLES ON RAILROADS
Filed April 12, 1927  5 Sheets-Sheet 3
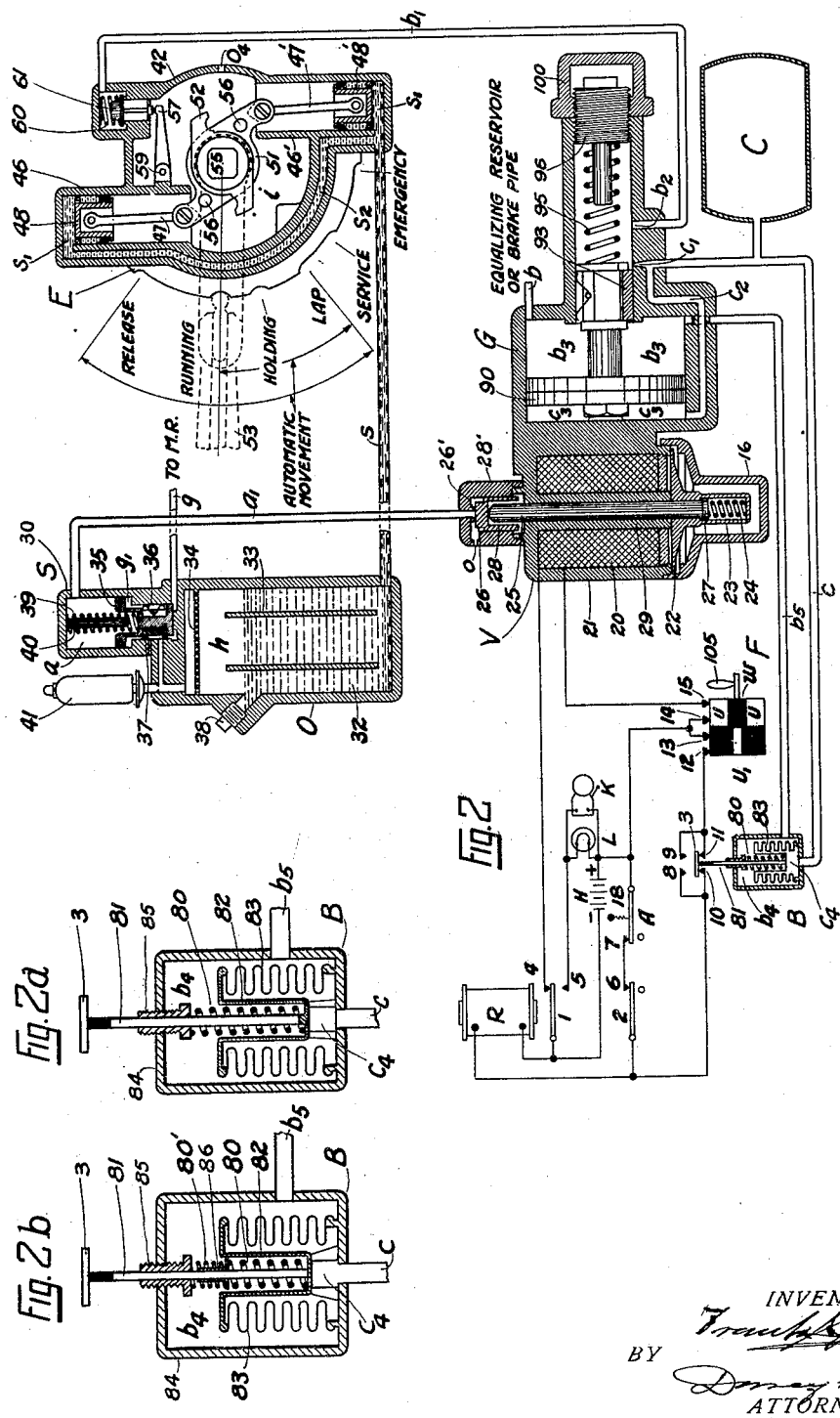

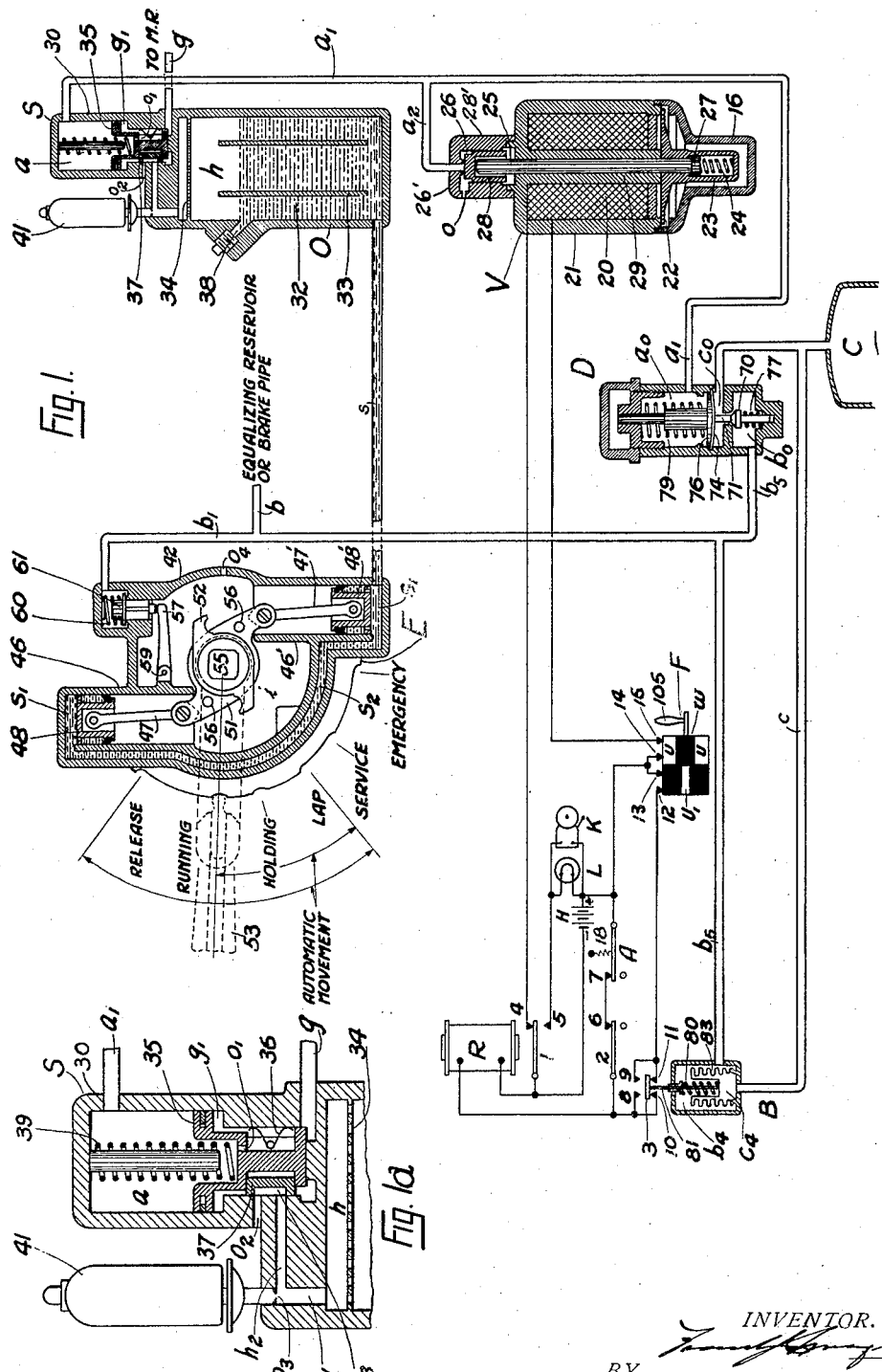

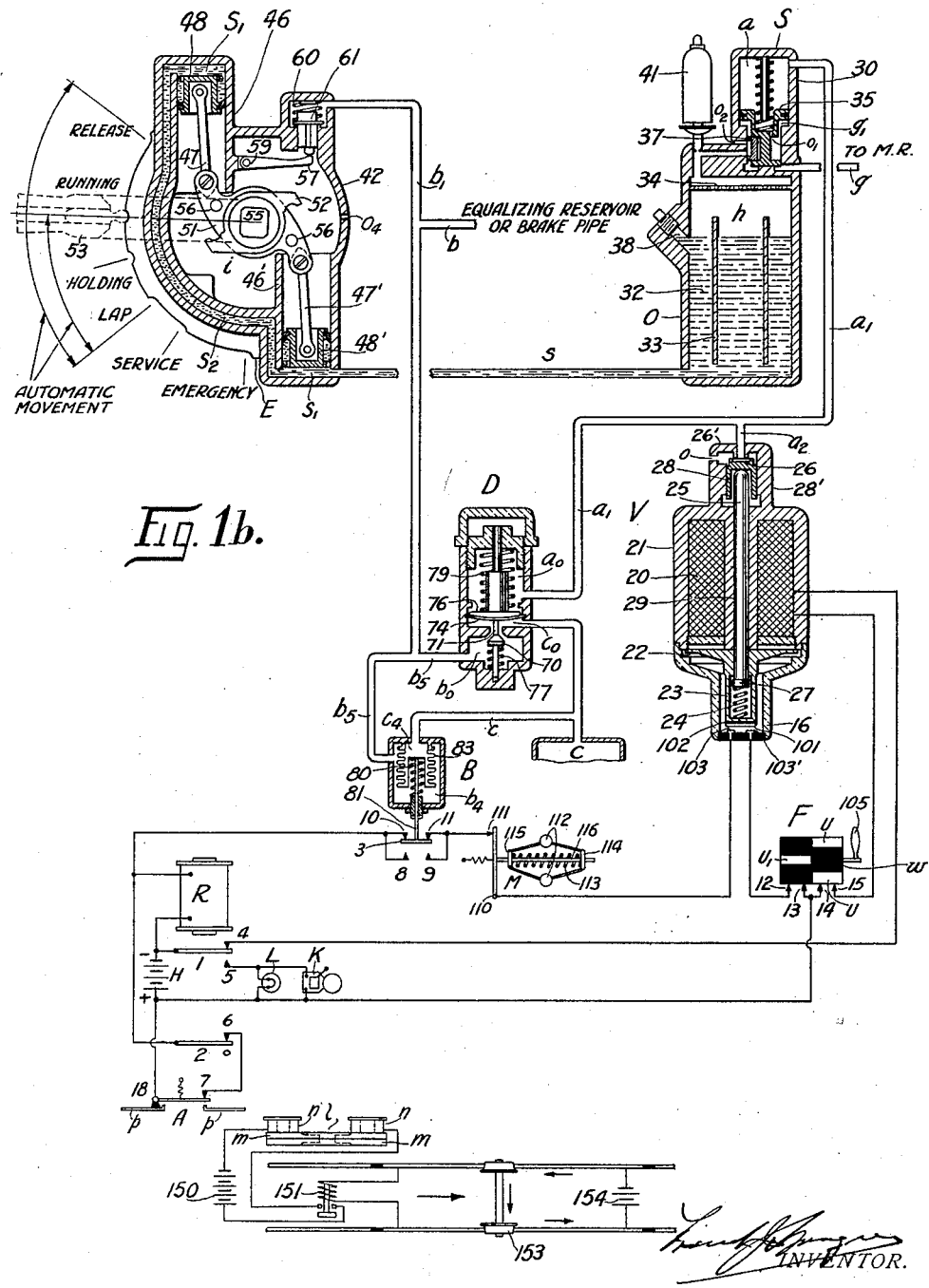

Sept. 6, 1932. F. J. SPRAGUE 1,876,032
APPARATUS FOR CONTROLLING MOVEMENT OF VEHICLES ON RAILROADS
Filed April 12, 1927 5 Sheets-Sheet 4
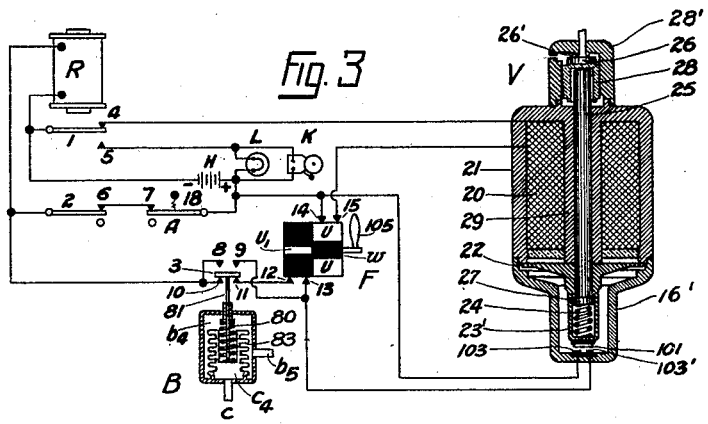
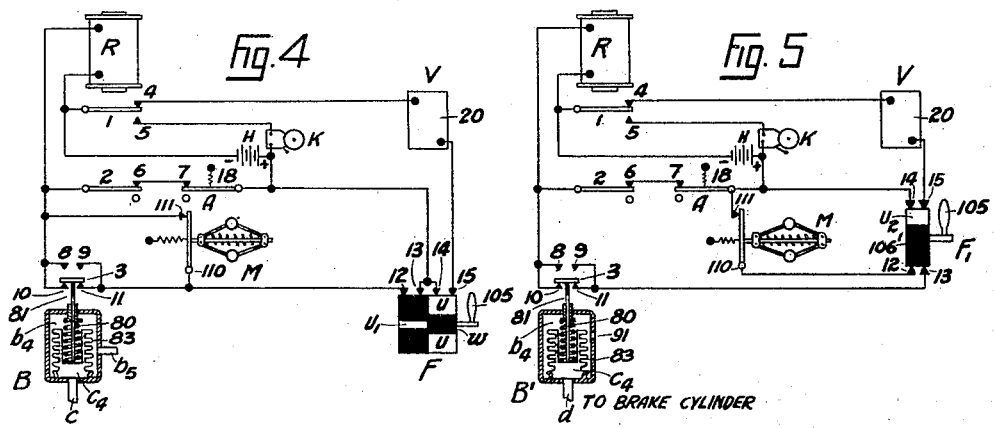
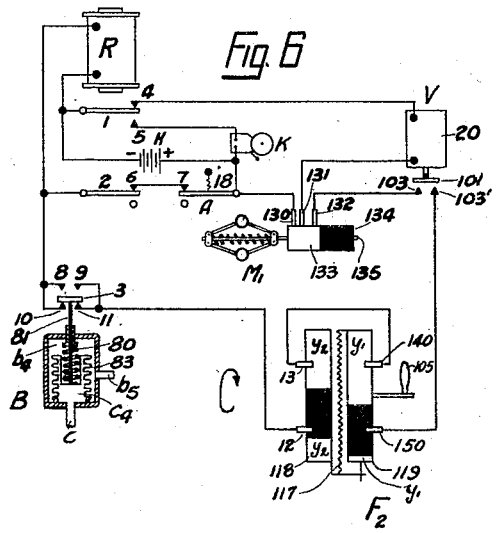
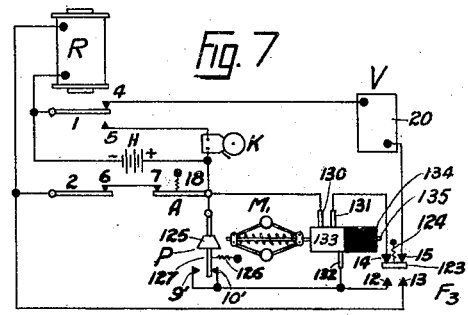
INVENTOR.
BY
ATTORNEYS.

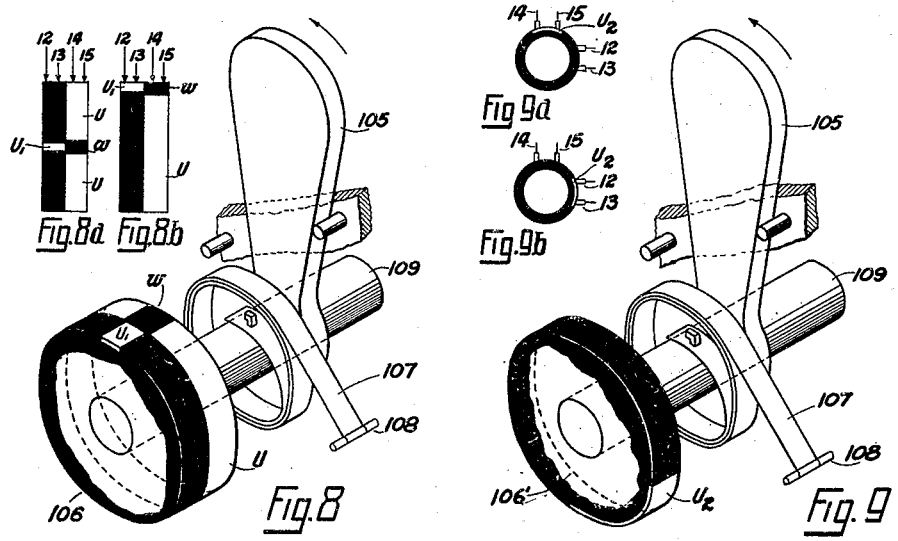
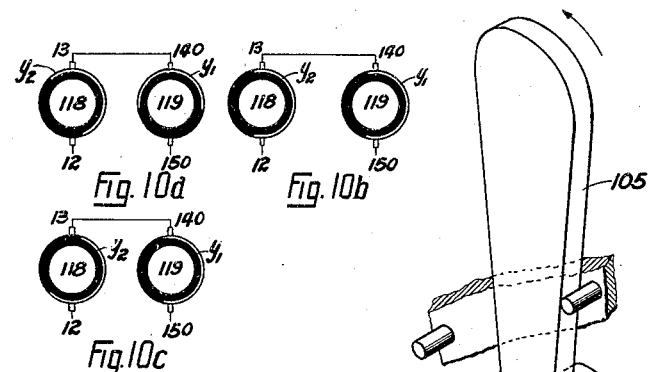
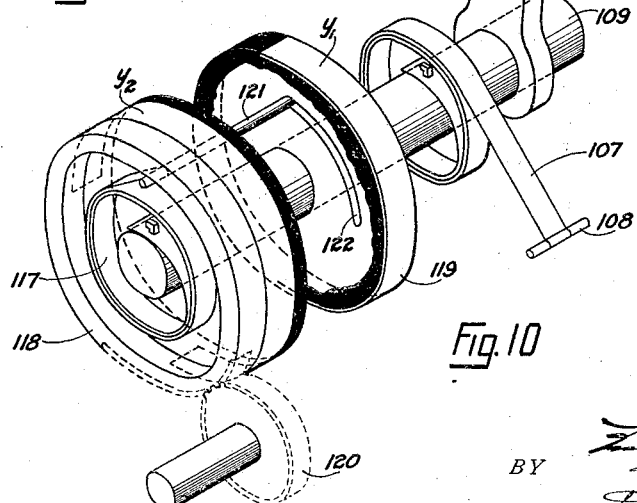

Patented Sept. 6, 1932

1,876,032

UNITED STATES PATENT OFFICE

FRANK J. SPRAGUE, OF NEW YORK, N. Y., ASSIGNOR TO SPRAGUE SAFETY CONTROL & SIGNAL CORPORATION, OF NEW YORK, N. Y., A CORPORATION OF VIRGINIA

APPARATUS FOR CONTROLLING MOVEMENT OF VEHICLES ON RAILROADS

Application filed April 12, 1927. Serial No. 183,193.

My invention relates to an improvement in automatic train control systems, and particularly to the features known as forestalling and resetting, the former being an operation by which the engineer may, by the performance of a suitable manual act, prevent the coming on of an automatic brake application, and the latter an operation by which the brake controlling apparatus may be restored to normal condition, after which the brakes (if applied) may be released and free running conditions established.

In much of present practice the forestalling and resetting operations are effected by mechanisms differently placed, the forestalling being done in the cab, and the resetting through a switch or other device situated at such inconvenient point as will require the train to be stopped before it can be used, so as to prevent release of brakes, applied in response to a track initiated impulse, before the train has come to rest, although sometimes this reset switch is made inconvenient but possibly accessible when moving at slow speeds.

To place some restriction upon the act of forestalling, which unless limited by the condition that a train must be actually braked or has had its speed reduced to some predetermined rate—although present practice and rules actually permit forestalling at any speed and without any pre-application of the brakes—it has been proposed to limit the time period in which the engineer may forestall an automatic brake application when receiving a track impulse. This is done in certain electrically controlled systems by connecting a forestalling switch and circuits so that after manual operation of the switch by the engineer the forestalling circuit will be closed, and the essential circuit will be maintained for only a limited time, the movement of the switch handle initiating a motive force which after a short interval will open the essential circuit, just as the pilot circuits are made and opened in my Letters Patent No. 660,065 on the multiple-unit system of train control.

With this arrangement, the engineer, on approaching a stop indication point within a distance less than he will cover in a predetermined time, which may be anything from a hundred to a thousand feet or more, according to the speed of a train, moves his switch to the forestalling position, closes the forestalling circuit and initiates the motive force, which will open the essential circuit automatically in a predetermined time—say, 15 seconds. After passing the stop indication point, if he returns the switch to the normal position within the time period there will be no automatic braking, although some part of the equipment may be responsive. But if the switch is held in the forestalling position for longer than the time period the brakes will come on.

Thus there are three conditions in which the automatic brake application may take place as a result of passing a stop indication point. First, if the engineer does nothing; second, if he forestalls too soon; and, finally, if he holds on too long. Any of these conditions may possibly act adversely as regards train movements.

With the automatic brake application in effect, the amount of braking is made such as to bring the train to a stop, after which the engineer or fireman must get down from the cab, or climb out to a position difficult of access when the locomotive is moving, to reset the brake initiating apparatus, so that the engineer may release the brakes manually.

The main object of thus separating the forestalling and resetting actions, and providing a time limit is to induce some measure of alertness on the part of the engineer, under possible penalty, and to insure that once the brakes have actually come on automatically the train shall be stopped before the engineer can release them.

There are serious objections to both practices, and specifically to the lack of restriction of the use of a forestalling device, as well as to the necessity for getting out of the cab to enable the brakes to be released.

This latter act cannot be performed at times without serious danger, as in tunnels, snow-sheds and on trestles, or in proximity to passing trains and under conditions of poor visibility.

I desire, therefore, to provide definite limitations upon the act of forestalling, as well as upon the act of resetting, while the timing mechanism for opening the forestalling circuit may be omitted entirely. I plan, also, to combine in a single mechanism—operated in the cab—both the forestalling and resetting operations, and for compelling, under possible penalty, acknowledgment of the receipt of a brake initiating impulse from the track. This mechanism may conveniently be referred to as an "acknowledging device".

My invention will conduce to safety and convenience, and eliminate delays, while making it possible to impose upon the engineer such precautionary conditions as are essential to safe operation and the maintenance of the fundamentals of automatic train control systems.

The accompanying drawings and specification illustrate my invention as applied to a system of automatic train control which cooperates with the usual type of air brake equipment in whole or in part. It is of course applicable not only to vehicles propelled by steam but to vehicles otherwise propelled. It should be noted that the mechanic, electric and pneumatic devices shown in these drawings serve merely to illustrate the nature of the invention, and thus do not limit it to the construction shown.

In the accompanying drawings which form a part of this application—

Figure 1 is a diagrammatic view of electric and pneumatic train control equipment embodying one form of my invention, wherein the pneumatic devices are shown in section.

Fig. 1a is an enlarged sectional view of the supply valve S shown in Fig. 1.

Fig. 1b is a diagrammatic view of electric and pneumatic train control equipment similar to Fig. 1 with some modification in the electric parts.

Fig. 2 is a diagrammatic view partly in section showing the same electric and pneumatic equipment as Fig. 1, excepting that the capacity charging valve D of Fig. 1 is replaced by a service reduction valve G.

Fig. 2a is an enlarged sectional view of the sylphon-operated contactor B of Figs. 1 and 2.

Fig. 2b is a sectional view of a modified form of the sylphon-operated contactor B of Fig. 2a.

Figs. 3 to 7 inclusive, are diagrammatic views partly in section illustrating alternative forms of my invention.

Fig. 8 is a diagrammatic perspective view of the rotatable contactor mechanism used for the acknowledging device of Figs. 1, 2, 3 and 4.

Figs. 8a and 8b are developments of the rotatable contactor 106 of Fig. 8, Fig. 8a illustrating the relative position of the rotatable contacts and the stationary contacts in the normal position of the acknowledging device and Fig. 8b illustrating these contacts in the operated position.

Fig. 9 is a diagrammatic perspective view of the rotatable contactor mechanism of the acknowledging device shown in Fig. 5.

Figs. 9a and 9b are schematic side views of the rotatable contactor 106' of Fig. 9 representing with regard to the acknowledging device of Fig. 5 the relative positions of the rotatable and stationary contacts for normal and operated positions respectively.

Fig. 10 is a diagrammatic perspective view of the rotatable contactor mechanism of the acknowledging device of Fig. 6.

Figs. 10a, 10b and 10c are schematic side views of the rotatable contactors of 118 and 119 of Fig. 10, Fig. 10a showing the relative position of the rotatable and stationary contacts in normal running position, Fig. 10b an intermediate position of these contacts during operation, and Fig. 10c their final position if the handle of the device is moved to and retained in its operated position.

Taking up first an explanation of the electric-equipment and circuits of Fig. 1:—

Relay R represents the governing element of the circuits. This relay is normally energized, its maintaining circuit being the following: Plus of battery H, contact A, contacts 7, 6, armature 2, coil of relay R, and back to the negative of the battery. As the maintaining circuit of relay R includes its own armature 2 it is, therefore, a "stick relay" which, when once deenergized, cannot be re-energized by way of its normal maintaining circuit.

The contact A represents an element for changing the electrical condition of the governing element of the circuits, herein illustrated as a stick relay. It is for convenience illustrated as a spring tensioned contact. It is intended to be controlled by track elements. In the specific illustration it is normally held against its cooperating contact so as to close the maintaining circuit of relay R. However, if an active application track element is passed this contact A is so affected as to open the maintaining circuit of relay R at contact 7. The word "active" in this connection refers to the condition of the track element which is intended to initiate automatic braking and does not refer to the inherent condition of the track element itself. The term "track element" is likewise employed in its broadest sense irrespective of the type of system, whether continuous or intermittent, to which my invention is applied. For illustrative purposes I have indicated, in a schematic way in Fig. 1b an intermittent inductive type of system, such being fully described in my British Patent

149,922, or my U. S. Patent No. 1,669,165 of May 8, 1928. In Fig. 1b the track element is represented by an application magnet 1 of the compound type which consists of a permanent magnet m provided with neutralizing coils n. The neutralizing coils are energized from a battery for clear traffic conditions in which case their field neutralizes or deflects the field of the permanent magnet. For non-clear traffic conditions, however, the neutralizing coils are deenergized in which case the flux of the permanent magnet is effective and the track element "active."

The traffic control is shown in a conventional way.

In Fig. 1b the receiver of the locomotive is represented by plates p which collect the flux when passing over an active magnet. The contact A is adapted to be magnetically attracted by the plates p and break the circuit of which it forms part and which will be later traced.

Referring again to Fig. 1, the stick relay R normally maintains an armature 1 against a contact 4 in the normally closed circuit of an electro-pneumatic vent valve V.

The maintaining circuit of the coil 20 of the vent valve is as follows: Plus of the battery H, contact 14 of an acknowledging device F, strip contact u, contact 15, coil 20 of the vent valve, front contact 4 and armature 1 of relay R, back to negative of the battery. Contact u of the acknowledging device is normally in a position such as is shown in Fig. 1 and Fig. 8a, thus closing the circuit above referred to and maintaining the coil 20 energized.

As mentioned previously, when stick relay R is deenergized, as happens when passing over an active application track element, it cannot be re-energized by way of its normal maintaining circuit, even after such track element is passed and contact A has assumed its normal position; such re-energization can only take place by way of re-energizing circuits, these circuits being governed partly by the acknowledging device F and partly by a sylphon-operated contactor B.

The rotatable contactor mechanism which forms the main part of this acknowledging device is shown in Fig. 8. It consists mainly of a shaft 109, on which is fixedly mounted a handle 105 and a rotatable contactor 106, this contactor being maintained in its normal running position by a spring 107, this spring being anchored to some suitable fixed part illustrated by pin 108. The device may be put in operative position by moving the handle 105, which is preferably associated with suitable stops, in the direction shown by the arrow. On the rotatable contactor 106 are two metal strip contacts: a long strip u forming an almost closed ring, being broken only by a short insulation w, and a short metal strip u1 opposite to and shorter than the insulation w, the whole contactor assuming the form of a cylindrical drum.

In the normal position, as shown in Fig. 8a, contacts 14 and 15 are bridged by strip contact u, thus maintaining the circuit at this point for the vent valve. In the operated position, as shown in Fig. 8b, contacts 14 and 15 rest on the insulated portion w, thus breaking the circuit of the vent valve. However, in this operated position contacts 12 and 13 are bridged by the short strip contact u1. It can be seen, that the relative position of contacts u and u1 is such that they cannot bridge their respective contacts 14—15 and 12—13 simultaneously, no matter what the position of the acknowledging device.

The sylphon-operated contactor B comprises a housing 84 (see Fig. 2a) in which is mounted a sylphon 83 normally under equal air pressures inside and out. The sylphon carries a cap 82 to which is attached a stem 81 which slidably extends through the housing (by means of a substantially air-tight bushing 85) and supports an insulated disc contact 3. The stem 81 is surrounded by an adjustable coil spring 80 which abuts against the bushing and the cap and normally holds the disc contact 3 in its lower-most position. Pneumatic connection is made with the sylphon-operated contactor by means of pipe c which communicates with the chamber c4 inside the sylphon, and pipe b—5 which communicates with the chamber b—4 outside the sylphon. The operation of the sylphon-operated contactor depends upon a differential of pressure in the chambers c—4 and b—4. With the set-up of equipment illustrated in Fig. 1 as will later be explained in detail, both chambers are normally supplied with air at equalizing reservoir or brake pipe pressure. In this case a reduction of the pressure in pipe b5 and chamber b4 occurs whenever a brake application, manual or automatic, occurs. The pressure in pipe c, and chamber c4 is reduced on manual application but not on automatic application. Consequently, on automatic application the contact 3 will be moved upward, breaking connection between contacts 10 and 11. If the difference in pressures in chambers b4 and c4 exceeds a certain predetermined value corresponding with the adjustment of the spring 80, contact 3 reaches its uppermost position and bridges contacts 8 and 9.

Increased sensitiveness in the operation of the sylphon-operated contactor B may if desired be secured by the modified form illustrated in Fig. 2b. This form corresponds in all respects with that illustrated in Fig. 2a except in the inter-position of a comparatively weak spring 80' between one end of the spring 80 and its corresponding abutment herein shown as the bushing 85. A stop collar 86 is illustrated as supporting the spring 80' upon the spring 80 and as limiting the compression of the spring 80'. This arrangement assures a movement of the contact 3 upon a lesser differential of pressure in the chambers b4 and c4 than in the case of the form illustrated in Fig. 2a.

Still referring to Fig. 1 the pair of contacts 10 and 11 are in shunt to the pair of contacts 8 and 9 in a circuit of the relay R which may be referred to either as the forestalling circuit or the reset circuit, depending upon which pairs of contacts are closed by the disc contact 3. That circuit is as follows: Positive of battery H, contacts 13 and 12 bridged by the strip contact u1 when the acknowledging device is appropriately moved as above pointed out, contacts 11 and 10 or 9 and 8 bridged by disc contact 3, the coil of relay R, to negative battery. As forestalling may take place when contacts 10 and 11 are bridged by disc contact 3 the circuit embracing them may be deemed a forestalling circuit. As these contacts are broken on automatic braking and the closure of contacts 8 and 9 may result therefrom the circuit embracing contacts 8 and 9 may be deemed a resetting circuit. Furthermore, it will be seen that to forestall automatic braking it is essential to move the acknowledging device into operative position so that the contacts 12 and 13 will be bridged prior to the breaking of contacts 10 and 11, but that the movement for resetting may occur simultaneously with or subsequent to the bridging of contacts 8 and 9.

A lamp L and an audible alarm K may serve to give warning whenever relay R is deenergized, as in such case armature 1 drops and both lamp L and alarm K are energized, the current flowing from the plus side of battery H, through both lamp L and alarm K, through back contact 5, and armature 1, to negative battery. It is in response to these signals that the engineer is afforded an opportunity of forestalling automatic braking as in the preferred form of my invention sufficient time delay is provided between the oncoming of the signal and the oncoming of the automatic brakes (a matter later to be explained) to permit forestalling of the latter. Obviously, however, forestalling may be accomplished in response to way-side signals.

The pneumatic equipment herein illustrated is particularly designed for use in connection with the E-T Westinghouse automatic brake equipment, but it is to be understood that my invention is not limited to employment with that system. Convenient reference may be made to Sprague British Patent No. 149,922 for a comparison of the E-T system with that of the Westinghouse equipment employing the G-6 engineer's valve. It is considered that those skilled in the art are familiar with standard Westinghouse equipment as well as that of other companies for instance that of the New York Air Brake Company and that no description of such systems need be incorporated herein, particularly in view of the descriptions contained in the Sprague British patents. Furthermore much of the pneumatic equipment herein illustrated follows very closely that of the Sprague British Patent No. 149,922, and reference may be had thereto for a complete description of the common units.

The electro-pneumatic vent valve V comprises a valve 26 normally maintained in closed position by the normally energized coil 20 of the electro-magnet, the circuit of which has been previously explained. The valve 26 is provided with a guide 28 to which is attached a non-magnetic stem 25 which passes loosely through the iron core 29 of the coil and through a soft iron disc armature 22 and terminates in a shoulder 27 upon which the armature rests. The armature is provided with an extension cap 23 which carries a spring 24 exerting pressure against the shoulder 27 and thus providing proper seating for the valve 26. The coil is mounted in a housing 21 of magnetic material closed at the bottom by a non-magnetic protective cap 16, and carrying on the top the body 28' for the valve. The valve body cooperates with the valve guide 28, and is provided with a port o to atmosphere and with a passage way or pipe a2, normally carrying main reservoir air as will later be seen, which terminates in the seat 26' of the valve.

The supply valve S and oil reservoir O form a unit in which the supply valve, comprising a piston-actuated slide valve, is mounted on top of the oil reservoir and is used to control the supply of main reservoir pressure to the latter.

The supply valve S as shown in Fig. 1a comprises an appropriate body 30 which embodies the cylinder for a piston 35 and the seat for a U shaped slide valve 37, which is seated by spring 36 and is guided and moved by the piston. A chamber a above the piston is in communication with a chamber g1 beneath the piston through a restricted orifice o1. Thus balanced air pressures exist normally on both sides of the piston, these pressures being supplied through a pipe g from the main reservoir. A pipe a1 connects the chamber a with the pipe a2 leading to the vent valve. A differential of pressure is normally maintained downwardly on the piston 35 by means of a suitably mounted spring 39 normally holding the piston and valve in their lower position.

In this position of the valve, chamber h of the oil reservoir is connected to atmosphere via passages h1 and h2, the cavity h3 of slide valve 37 and port o2, and no pressure is exerted on the oil 32 contained in the reservoir. A screen 34, baffling plates 33 and an oil supply port 38 are provided in the oil reservoir.

In case the vent valve V is de-energized main reservoir air pressure is exhausted from chamber $a$ through the port $o$ via pipes $a1$ and $a2$ at a rate much faster than it can be supplied through the orifice $o1$. The resultant unbalanced air pressure forces the piston 35 upwards, thereby causing the slide valve 37 to lap atmospheric exhaust port $o2$ and connect passage $h2$ with chamber $g1$, consequently supplying main reservoir air to the top of the oil. Main reservoir air also escapes through a restricted orifice $o3$ via a whistle 41 mounted on the valve body giving an audible warning. The time delay of the system may or may not be predetermined to provide for the blowing of this whistle prior to the time when forestalling may be accomplished.

The engineer's automatic valve head E herein illustrated is identical with that shown in Figs. 1 and 2 of Sprague British Patent No. 149,922 and replaces the head of the H6 engineer's valve in a manner similar to that of this British patent. Reference may be had to this British patent for a more complete description than is herein given. Briefly the standard head of the engineer's H6 brake valve is provided with a sector having notches corresponding with the six positions of the valve, to wit, release, running, holding, lap, service and emergency, which sector cooperates with the engineer's handle in holding the valve (by a light spring pressure) in any of these positions to which it is moved. That sector is incorporated in my special brake head and the positions are indicated in Fig. 1 hereof. Release, running and holding may be regarded as charging positions; lap, service and emergency as non-charging positions. In the preferred form of my invention automatic braking is accomplished by or incidental to a movement of the engineer's automatic brake valve to a non-charging position, preferably though not necessarily lap.

The brake head body 42 is provided with two pistons 48, 48', which reciprocate in cylinders 46, 46' and are connected by means of rods 47, 47' to the ends of a driving yoke 51, which is centered upon, but not fixed to, the spindle 55 of the rotary valve. Located above this yoke and keyed to the spindle is a driven yoke 52. This driven yoke turns with the engineer's handle 53 and is so shaped as to be engaged by dowels 56, 56 projecting upwardly from the driving yoke. The manner of engagement of this yoke is such as to permit the engineer at all times to apply the brakes manually, but may prevent movement of the handle toward charging positions during an automatic brake application. This latter is determinable by the size of the pistons, the force automatically applied thereto and the leverages of the parts. It is, therefore, in the discretion of the road adopting the invention. My preference is that the movement in question towards charging position be rendered very difficult by the engineer. The engineer, however, has complete freedom for the movement of his handle and valve to all positions in the absence of automatic braking.

Normally, oil at atmospheric pressure enters through a pipe $s$ from the bottom of the oil tank O to the chambers $s1$, $s1$ of the brake head cylinders 46, 46', cavity $s2$ connecting the brake head cylinders. In case of an automatic brake application this oil, under main reservoir pressure, forces the pistons inward in respect to the valve head body, turning the driving yoke 51 counter-clockwise around the spindle. As the pistons continue to move the driving yoke engages the driven yoke 52, by means of dowels 56, thereby turning the handle and the rotary valve until at the end of the stroke they stop in the lap position.

A pilot valve 61 mounted in the body of the brake head is normally held closed by a spring 60 and equalizing reservoir pressure supplied by a pipe $b1$ connected with the equalizing reservoir by a pipe $b$. When the actuating pistons are operated the end of connecting rod 47' bears against a lever 57, which is pivoted on an extension 59 of the cylinder 46, so opening the valve 61 and venting the pressure in pipes $b$ and $b1$ to atmosphere through a chamber $i$ of the brake head and a port $o4$ in the side of the valve body. The opening of the pilot valve is preferably substantially coincident the completion of the movement of the engineer's valve to lap position.

The actuation of the engineer's brake valve in accomplishing or incidental to automatic braking is subject to wide variation. For example, while I have here shown the employment of oil as a motive force main reservoir air may be directly utilized. See Sprague British Patent No. 18,213 of 1915. In fact the control features of my invention are not confined to any movement whatsoever of the engineer's brake valve.

A capacity charging valve D comprises a body divided into three chambers $ao$, $bo$ and $co$, these chambers being connected with the respective pipes $a1$, $b5$ and $c$. Chambers $ao$ and $co$ are separated by a diaphragm 74. Upon this diaphragm rests a mushroom 76, normally pressed down by the combined pressure of main reservoir air and a spring 79. A valve 70 is normally held open by the pressure exerted by the diaphragm on its extension stem 71 and communication between chambers $co$ and $bo$ is maintained and equalizing reservoir pressure normally supplied these chambers from pipe $b1$ which joins pipe $b5$.

A capacity tank C is connected into the pipe $c$ and thereby supplied with equalizing reservoir pressure. When an automatic application occurs, main reservoir air is exhausted from chamber *ao* through pipes *a*1 and *a*2 and port *o*, causing the pressure in chamber *co* to raise the diaphragm lifting the pressure from stem 71 of valve 70. This valve is then forced closed by a spring 77, closing communication between chambers *co* and *bo*, and trapping air in the capacity tank substantially at original equalizing reservoir pressure.

The sylphon-operated contactor B has been described previously, and it is only necessary here to point out that the pressure supplied by pipe *b*5 to chamber *b*4 on the outside of the sylphon is equalizing reservoir pressure, and the pressure supplied by pipe *c* to chamber *c*4 on the inside of the sylphon is capacity reservoir pressure. These pressures are normally balanced. However, in the case of an automatic brake application, due to the closing of valve 70 the pressure in chamber *c*4 will not reduce with the reduction of the equalizing pressure due to the opening of the pilot valve 61, and a difference in pressures of the amount of the equalizing reservoir reduction will be established on the two sides of the sylphon, causing a corresponding movement of the sylphon and the contact 3. It will be observed that original equality of pressure is present in chambers *b*4 and *c*4 regardless of the value of initial pressure and that the differential of pressure is uniform irrespective of thhe initial pressure. This is of importance as equalizing reservoir pressure may not be normal at the time of automatic brake application and in the event that pipe *b*5 is connected with the brake pipe instead of the equalizing reservoir there may be variation in the initial pressure. Furthermore, the operation of the sylphon-operated contactor is thus rendered independent of feed valve adjustment.

In the form of my invention illustrated in Fig. 1 the pipe *b* is specified as leading either to the equalizing reservoir or the brake pipe. In the event that it leads to the brake pipe care should be taken that the brake pipe exhaust by means of the valve 61 and port *o*4 is of suitable capacity to effect automatic braking at the desired rate—somewhat larger than when the equalizing reservoir is bled. It will be readily understood that the chambers *co* and *bo* of the capacity charging valve, the capacity tank C and the chambers *b*4 and *c*4 of the sylphon-operated contactor in being supplied with air from the brake pipe rather than from the equalizing reservoir will not have their functions or mode of operation changed.

General operation

Under normal conditions stick relay R is energized, its armatures 1 and 2 attracted, the acknowledging device in the position shown in Figs. 1 and 8*a*, the sylphon contact 3 in its lower position bridging contacts 10 and 11, and the coil 20 of vent valve V energized.

The normal position of the pneumatic equipment is illustrated in Fig. 1. Main reservoir air pressure is trapped in pipes *a*1, *a*2 and chambers *a* and *ao* by the closure of valve 26. The slide valve 37 being in its lower position (Fig. 1*a*), chamber *h* is connected to atmosphere; no pressure being exerted on the driving pistons 48 and 48′ the brake handle 53 can be moved by the engineer to any position. With main reservoir air pressure in chamber *ao*, valve 70 of the capacity charging valve is maintained open, permitting communication between chambers *bo* and *co* and (the pilot valve 61 being closed) supplying equalizing reservoir pressure to the capacity reservoir C and the chamber *c*4 of the sylphon, chamber *b*4 being directly supplied with equalizing reservoir pressure through pipes *b*5 and *b*.

When an active application impulse is received from the track, contact A is attracted, as previously described, thus breaking the circuit of stick relay R. De-energization of stick relay R drops armatures 1 and 2. Dropping of armature 1 causes deenergization of the vent valve coil 20 opening valve 26 and initiating the operation of the air equipment.

Armature 1 now makes back contact 5 and closes the circuit of both the visible and the audible alarms L and K, respectively. A warning is given to the engineer that danger conditions are ahead, and that an automatic brake application will be effected unless preventing action is taken by him.

Assume, now, that the engineer is not prepared to heed such warning, or is incapacitated. An automatic brake application will then occur, due to the following operation of the air equipment. The valve 26 being opened, main reservoir pressure is exhausted from chambers *a* and *ao*.

This exhaust from chamber *a* causes upward movement of the supply valve piston 35 and slide valve 37 which laps port *o*2 and at the same time permits main reservoir pressure to enter from pipe *g* via chamber *g*1, cavity *h*3 and passages *h*2 and *h*1, to chamber *h* above the level of the oil. This main reservoir pressure causes a movement of the pistons 48, 48′ and driving yoke 51, which in its turn engages, by means of dowels 56, with driven yoke 52 and moves the brake handle and the rotary valve from any charging position into lap position. At the same time rod 47′ presses against lever 57 and opens the pilot valve 61, and causes an exhaust of air from the equalizing reservoir with resulting braking. Main reservoir air is also vented through restricted opening *o*3 and the whistle 41 blown.

The exhaust of main reservoir pressure from chamber $ao$ of the capacity charging valve closes valve 70, and pressure, substantially equal to the value of the original equalizing reservoir pressure, is trapped in the capacity tank C and chamber $c4$ of the sylphon contactor B. Resultant differential of pressure on the two sides of the sylphon 83 causes the upward movement of contact 3 and its disengaging with contacts 10 and 11. However, when a certain reduction of the equalizing reservoir pressure has taken place,—the value of which is dependent on the adjustment of the spring 80,—the contact 3 bridges the top contacts 8 and 9. This adjustment may be such that, for instance, a full service reduction is needed to bridge these top contacts.

It has been pointed out that these contacts 8 and 9 are in the resetting circuit of the stick relay R, and that the restoration of the electric and the air equipment is dependent upon their closure which can only be affected after a predetermined braking has taken place, corresponding to an equalizing reservoir pressure reduction sufficient to move contact 3 to its uppermost position. When this reduction has been made the engineer may, by moving the acknowledging device into its operative position, reenergize the stick relay R by closing the reset circuit at contacts 12 and 13. When the acknowledging device is released, it is restored to its normal position by spring 107 and closes the vent valve circuit at contacts 14 and 15, where this circuit is broken in the operated position of the acknowledging device, thus completing the circuit of and reenergizing the coil 20 of the vent valve V.

By re-energization of the vent valve V, valve 26 is closed and main reservoir air builds up in chamber $a$, causing the supply valve piston 35 to move to its lower position. This causes exhaust of the main reservoir air through port $o2$ and permits free manual movement of the brake handle to a charging position with resultant release of the brakes.

Closing of valve 26 also restores the capacity charging valve D to normal, and, due to the equalization of air pressures in chambers $b4$ and $c4$, contact 3 is returned to its lower position.

Assume now that the engineer is alert and wishes to take advantage of the forestalling privileges. When an active application track element is passed and stick relay R is deenergized, then on receipt of an indication given from the audible alarm K or the visible signal L or both, the engineer moves the handle 105 of the forestalling device to its operated position and immediately releases the same. This momentarily breaks the circuit of the coil 20 of the vent valve at contacts 14 and 15 and bridges the forestalling circuit of the relay R at contacts 12 and 13, see Fig. 8b. The handle of the acknowledging device is immediately restored to normal position by spring 107, reestablishing the circuit of the coil 20 at contacts 14 and 15 and breaking the forestalling circuit of the stick relay R at contacts 12 and 13, see Fig. 8a. The bridging of the forestalling circuit at contacts 12 and 13 reenergizes the stick relay R causing it to raise its armature 1, discontinuing the alarms K and L and remaking the circuit of the vent valve coil 20 at contact 4. This circuit being completed at contacts 14 and 15 by the automatic restoration of the acknowledging device, the deenergization of the coil 20 is but momentary. This entire operation takes place before the sylphon-operated contactor B is operated and while contact 3 bridges contacts 10 and 11, as will now be explained.

There is a time lag between the de-energization of the vent valve V and an actual reduction in equalizing reservoir pressure necessary to operate the sylphon-operated contactor B. This time delay is due partly to the fact that a certain time is necessary to vent the air from chamber $a$, through pipes $a1$ and $a2$ and the orifice $o$, and partly to the mechanical and magnetic lag in other parts of the equipment.

This time lag between the de-energization of the vent valve and the actual reduction of equalizing reservoir pressure may be varied from a fraction of a second to several seconds, depending on requirements. Where train control is an auxiliary to wayside signals, and the track elements repeat the indication of wayside signals at or near which they are located, I prefer to make this time lag short, not more than a second or two, thereby forcing the engineer to pay attention to the wayside signals and not to rely on the danger indication of my device. However, where train control is used without wayside signals or track elements are not placed or rendered active at or near their corresponding signals, a longer time lag may be justified. By increasing the capacity of chamber $a$ and using a restricted orifice for port $o$, time delays of increased amounts can be easily obtained. As a short de-energization of the vent valve does not cause a brake application, the breaking of the vent valve circuit at contacts 14 and 15, during the operation of the acknowledging device, will be without braking influence, provided this device is operated and released within the provided time lag. This break in the vent valve circuit at contacts 14 and 15, on the other hand, prevents tying down the acknowledging device in the operative position.

Furthermore as the whistle 41 will start to blow immediately upon main reservoir air being admitted to the chamber $h$ this whistle may also serve as a forestalling signal; for there is a certain time delay in the operation of the engineer's automatic brake head and in the actual bleeding of the equalizing reservoir.

It has been brought out above that the operation of the sylphon-operated contactor B is independent of the value of the initial air pressure inside and outside the sylphon 83. It may be well to note the importance of this in connection with the operation of the system of Fig. 1 as a whole in its relation as to whether or not the engineer may have applied and is holding his brakes applied prior to and on passing an active application track element. In that event the pressure in pipe $b5$ and in pipe $c$ and the capacity tank C will be lowered in value corresponding to the manual equalizing reservoir or brake pipe reduction. However, the air pressure on the inside and outside of the sylphon 83 will be uniform and forestalling may take place as above outlined without automatic braking.

On the other hand when the acknowledging device F is to be employed to reset the control parts after an automatic brake application the reduction at which the resetting may occur (dependent upon the closure of contacts 8 and 9 by contact 3) with permissible release of the brakes accordingly, must be measured not only by the automatic braking (for example full service) provided by the adjustment of the spring 80 or 80' or both, but also by the manual braking which may be in effect when automatic braking occurs. Thus if the sylphon operated contactor is adjusted to close contacts 8 and 9 at say a differential air pressure of 20 pounds, if there is at the time of automatic braking a manual reduction say of 10 pounds the resetting cannot be accomplished until the combined braking corresponds to the sum of these two reductions—30 pounds.

It should also be noted that the sylphon-operated contactor may be operated by pressures other than the capacity and equalizing reservoir (or brake pipe) pressures. For instance, the pressures in the application cylinder and distributing valve release pipe may be used. The relation of these pressures has been gone into with considerable fulness in Sprague British Patent No. 149,922 and reference is made thereto without repetition herein. Or a single pressure may be used as shown in Fig. 5 (later to be described), where chamber $c4$ on the inside of the sylphon is connected by pipe $d$ to the brake cylinder pipe of the distributing valve or to one of the brake cylinders of the engine or tender, the outside of the sylphon being in connection with atmosphere via port 91. If other than capacity and equalizing (or brake pipe pressures) are used on the two sides of the sylphon contactor in the device as shown in Fig. 1 capacity charging valve D can be omitted altogether.

In Fig. 2, I have illustrated means whereby the automatic braking is predetermined in amount irrespective of initial equalizing reservoir or brake pipe pressure and whereby automatic braking is prevented by a manual braking of this predetermined amount. The electrical devices including the sylphon-operated contactor B (Figs. 2a and 2b) and circuits are identical with those illustrated in Fig. 1 as above described, as is likewise the engineer's automatic valve head E, supply valve S, oil tank O and the capacity tank C.

The valve by which predetermined automatic braking and forestalling on predetermined manual braking are brought about is herein illustrated as an automatic service reduction valve G of the piston actuated slide valve type which replaces the capacity charging valve D of Fig. 1. The particular valve illustrated is that designed by Frank Desmond Sprague and incorporated in his United States application Ser. No. 675,853, filed November 20th, 1923, and no specific claims directed solely thereto are made herein. But it is to be understood that this selection on my part is for convenience of ready illustration and is not a limitation. Other valves will suggest themselves to those skilled in the art. For example, the automatic service brake valve of my United States application Ser. No. 847,947 filed December 31st, 1914 (corresponding with Sprague British Patent No. 18,213 of 1915), or the automatic service brake valve of my United States application, Ser. No. 315,880 filed August 7th, 1919 (corresponding with Sprague British Patent No. 149,922) might be employed, and reference is made to the said British patents for illustration and description of these valves. Both of these valves embody the two features now under consideration. Therefore, reservation of all claims broadly covering the function, operation and structure of the valve G independently of its peculiar place in my present invention and in common with the corresponding valves in my two said United States applications is made for said applications, one or both as the case may be.

Referring now particularly to the service reduction valve G herein illustrated the body of the valve is conveniently shown as integral with the housing 21 of the vent valve V. The valve G embodies a tight fitting piston 90 on the stem of which is carried a slide valve 93 spring-pressed against its seat in the body of the valve. The pipe $b$ which enters the chamber $b$—3 to the right of the piston connects this chamber with either the equalizing reservoir or the brake pipe. Pressure air is normally led from this chamber to chamber $c3$ to the left of the piston through a restricted port $c1$ and channel $c2$. The port $c1$ is located immediately to the right of the slide valve so as to be blanked on initial movement thereof.

The pipe $c$ is connected with the channel $c2$ and by this means pressure air from the chamber $b3$ is led to the capacity tank C and the chamber $c4$ on the inside of the sylphon 83. The pipe $b5$ is led to the interior of the chamber $b3$ and pressure air therefrom thus conducted to the chamber $b4$ on the outside of the sylphon 83.

The piston 90 is normally maintained in its left hand position by means of an adjustable compression spring 95. The pipe $b1$ from the pilot valve 61 leads to a port $b2$ in the seat of the slide valve 93. The port $b2$ is located at such a distance to the right of the restricted port $c1$ as to assure the blanking of both ports in the operated position of the slide valve, so as to permit the desired reduction of air from the chamber $b3$ as will later be seen.

Assuming that the engineer is not alert or is incapacitated and does not take advantage of his forestalling privilege, and that the engineer's brake valve has been automatically moved to lap position and the pilot valve 61 opened (as will readily be understood from the above description of the system of Fig. 1), the equalizing reservoir or the brake pipe will be bled through pipe $b$, chamber $b3$, port $b2$, pipe $b1$, pilot valve 61 and port $o4$ until such time as the port $b2$ is blanked by the slide valve. On the initial drop of pressure in the chamber $b3$ the slide valve moves to cover the restricted port $c1$ and imprisons air in the chamber $c3$ at substantially its initial pressure. Movement of the slide valve 93 continues until the total pressure (air and spring) on the right of the piston equals the total pressure (trapped air) on the left of the piston. The character and adjustment of the spring should be such that at this moment the port $b2$ is blanked. This stops the bleeding of the equalizing reservoir or brake pipe and determines the amount of automatic braking. Inasmuch as the air pressures in chambers $b3$ and $c3$ were initially equal and independent of the initial pressure in the equalizing reservoir or brake pipe it will be seen that this automatic reduction and the consequent automatic braking are predetermined by the value of the spring 95, which by proper choice and adjustment is optional with the road adopting my system; for example, the arrangement may be such as to assure a full service braking.

Upon the initial movement of the slide valve 93 due to the opening of the pilot valve 61 it will now be understood that air at its initial pressure is trapped in the capacity tank C and the chamber $c4$ in the sylphon-operated contactor. It will also be apparent that air is bled from the chamber $b4$ of the sylphon-operated contactor through the pipe $b5$, chamber $b3$ and the port $b2$ until that port is blanked by the slide valve 93.

Whether or not the contact 3 bridges contacts 8 and 9 in the reset circuit of the stick relay R at this point depends upon the adjustment of the spring 80 or 80' or both of the sylphon-operated contactor. This affords means for governing the permissible release of brakes to suit varying requirements and the desire of roads installing my system. For example, to assure that the engineer may not reset his control parts and release the brakes prior to a predetermined equalizing reservoir reduction, the spring adjustment should be such that at least the differential of air pressure inside and outside the sylphon 83 required to close contacts 8 and 9 be equal to this predetermined equalizing reservoir reduction. Or again it may be desired to adjust the automatic braking at a comparatively low value and to compel the engineer to give an additional manual braking before he can reset the control parts and release his brakes. As such manual braking incurs further reduction of air pressure in chamber $b3$ of the service reduction valve and consequently in chamber $b4$ of the sylphon-operated contactor, the adjustment of the spring 80 or 80' or both may be made such as to retard the bridging of contacts 8 and 9 until a manual braking of predetermined amount has been added to the initial automatic braking.

Upon the bridging of contacts 8 and 9 it will be apparent that the handle 105 of the acknowledging device if moved to operative position will complete the reset circuit of the stick relay R at contacts 12 and 13 restoring the control part of the system and permitting releasing of the brakes.

Assuming that the engineer is alert and desirous to forestall automatic braking, he proceeds precisely as is set forth in respect to the form of my invention heretofore described in connection with Fig. 1 with like results except in the event of initial manual braking.

If the engineer has applied and is holding his brakes manually on the opening of the pilot valve 61, the consequent bleeding of air from chamber $b3$ and chamber $b4$ in the sylphon-operated contactor results in breaking contacts 10 and 11 in the forestalling circuit of the stick relay R rendering that circuit inoperative for its intended purpose. But this does not prevent forestalling, for if the brakes have been manually applied the predetermined amount as above explained the port $b2$ in the body of the service reduction valve G will be closed by the slide valve 93 and the subsequent opening of the pilot valve 61 will be ineffective to produce braking. Obviously the closing of the port $b2$ is independent of the manner in which pressure is reduced in chamber $b3$—whether initially through automatic actuation of the pilot valve 61 or initially by manual braking with reduction of pressure in the equalizing reservoir and the brake pipe.

This characteristic of the service reduction valve G has another bearing, to wit, in its relation to an automatic braking supplementing a manual braking. If the engineer has applied and is holding his brakes at the time of automatic opening of the pilot valve 61 at a lesser value than that predetermined for automatic braking, the slide valve 93 will have been partially moved toward port 62 but will not cover that port. Automatic opening of the pilot valve 61 will thereupon result in further reduction of air pressure in chamber 63 to complete the movement of the valve to its blanking position of port 62. Thus the combined manual and automatic braking will total that predetermined for sole automatic braking.

The forestalling and resetting circuits shown in Figs. 1c, 3, 4, 5, 6 and 7 are of the same type as shown in Figs. 1 and 2 with new elements added or substituted in various combinations. It should be noted that these figures as well as Figs. 1 and 2 are merely typical and that the invention is not restricted to the combinations shown, other combinations being possible as by employing the elements shown in one of the figures in place of the elements shown in another figure and so forth. In Figs. 3, 4, 5, 6 and 7 the pneumatic equipment is for the most part not illustrated. The vent valve V may be considered broadly as the pneumatic element initiating automatic braking. This is equally true respecting Figs. 1 and 2, for it will be apparent that the electrical equipment of Figs. 1 and 2 is not confined in its use to the particular pneumatic equipment there shown.

For readiness of understanding the various modifications shown in Figs. 1c, 3, 4, 5, 6 and 7 in their bearing upon pneumatic train control equipment of whatever sort it may be convenient to assume that the vent valve V is connected up and employed either with the pneumatic equipment of Fig. 1 or that of Fig. 2. In such cases that pneumatic equipment will operate as is previously described in connection with these figures.

Identity of parts is indicated by the employment of the same reference character as in Figs. 1 and 2, primes being added in the event of slight variations.

In discussing the modifications of Figs. 1c, 3, 4, 5, 6, and 7 no repetition of the description of the construction, practice or operation of parts already described will be made. Nor is it deemed necessary again to go into the inter-relation of these parts and the general operation of the system in which these are or may be embodied. For all of these matters reference should be made to the foregoing detailed descriptions relating to Figs. 1 and 2 and comments concerning the same.

In Fig. 1b the pneumatic equipment is identical with the one shown in Fig. 1, and the maintaining circuit of the stick relay R and vent valve V are identical with the circuits shown in Fig. 1. The forestalling and resetting circuits, however, include certain additional contacts not present in the corresponding circuits of Fig. 1.

These last mentioned contacts include contacts 110—111 controlled by a centrifugal speed governor M, suitably driven in any well-known manner from the wheels of the vehicle. Below a predetermined low speed which would usually be between 10 and 20 miles per hour, depending on the requirements, the speed governor actuated contact 110 is held against its co-operating contact 111 by a suitable spring; above the predetermined speed, however, this contact is open. The contacts 110—111 form part of both the forestalling and resetting circuit, neither forestalling, nor resetting, being thus possible unless the train speed is below the value for which the governor is adjusted.

There are also provided insulated contacts 103 and 103′, in the non-magnetic cap 16′ of the vent valve V, these contacts being normally open which are bridged by an insulated contact 101 on the bottom of the extension cap 23′, whenever the vent valve coil 20 is de-energized and its armature 22 dropped. The contacts 103—103′ and 101 form part of both the forestalling and resetting circuits, neither forestalling nor resetting being thus possible unless the armature 22 of the vent valve has been dropped.

In Fig. 1b there is also shown a diagrammatic way the track control which has already been described.

In Fig. 3 the maintaining circuit of the stick relay R and the vent valve V are the same as in Figs. 1 and 2, but changes have been made in the forestalling and resetting circuits. Both the forestalling and resetting circuits go through insulated contacts 103 and 103′ and insulated contact 101. From contact 103′ the forestalling circuit goes through contacts 12 and 13, identically as shown in Fig. 1. The reset circuit, however, is closed without the operation of the acknowledging device provided the differential of controlling air pressures in the sylphon operated contactor B has been sufficient to move contact 3 into its upper contacting position.

In Fig. 4 contacts 110 and 111 of a centrifugal speed governor M have been placed in shunt to the contacts 10, 11 and 8, 9 in the respective forestalling and reset circuits of the stick relay R of Figs. 1 and 2. This speed governor thus permits both forestalling and resetting independently of the sylphon-operated contact 3 if the train speed is below the value for which the governor is adjusted and the engineer operates the acknowledgment device.

In Fig. 5 speed governor contacts 110 and 111 are in series with the contacts 10 and 11 and 8 and 9 respectively in the forestalling and resetting circuits of the stick relay R as in the case of Fig. 1b; a modified form of the acknowledging device is illustrated; and the sylphon-operated contactor B' is differently actuated than that specifically illustrated in Figs. 1 and 2, although as above pointed out the one herein shown might be employed in the arrangement of Figs. 1 and 2.

The acknowledging device of Fig. 5 is illustrated in Figs. 9, 9a and 9b, Figs. 9 and 9a showing the normal position and Fig. 9b the operative position. A single rotatable cylindrical contactor 106' is fixedly mounted on the shaft 109. The surface of this contactor if of insulation except for the insulated metal strip u2 which as shown in Fig. 9a normally bridges contacts 14 and 15 in the circuit of the coil of the vent valve V. When the acknowledging device is moved to operative position this circuit is broken and the forestalling and resetting circuits of the stick relay R established at contacts 12 and 13 as shown in Fig. 9b.

The sylphon-operated contactor B' of Fig. 5, as heretofore referred to, has its inside chamber c4 connected by pipe d with the break cylinder pipe of the distributing valve or with one of the brake cylinders of the engine or tender. The outside chamber b4 has a port 91 to atmosphere. Both chambers are therefore normally at atmospheric pressure and contact 3 maintained in bridging relation to contacts 10 and 11 by spring 80 (or springs 80 and 80', Figs. 2a and 2b, as will readily be understood). Pressure in chamber c4 is a direct function of and corresponds with that applied to the vehicle, and the differential of air pressure required to move the contact 3 to bridge contact 8 and 9 now becomes a differential between that pressure and atmosphere. Spring 80 or 80' should therefore be adjusted accordingly.

The relation of contacts in the forestalling and resetting circuits of the relay R in Fig. 5 is such that forestalling or resetting of the control equipment is possible only if three conditions are fulfilled: first, that the speed of the vehicle should be below that predetermined for opening contacts 110 and 111; second, that the acknowledging device should be moved to operative position with consequent closure of contacts 12 and 13; third, that the sylphon-operated contact 3 respectively bridge either contacts 10 and 11 or contacts 8 and 9.

In Fig. 6 the contacts 101, 103, 103' of Fig. 3 are incorporated, a modified form of acknowledging device F2 is illustrated, and the centrifugal governor M1 (driven from the wheels of the vehicle) controls certain of the circuits by means of a cylindrical circuit breaker 135.

The acknowledging device F2 of Fig. 6 is illustrated in Figs. 10, 10a, 10b and 10c, the normal position being shown in Figs. 10 and 10a, an intermediate position in Fig. 10b and the final position in Fig. 10c prior to automatic return of the device to normal. Two cylindrical contactors 119 and 118 are mounted on the shaft 109. The contactor 119 is fixed to the shaft. The contactor 118 is not rigidly fixed to the shaft but is connected therewith by a spiral spring 117, located within the annular space in the contactor. This spring tends to move the contactor towards operative position, but normally the contactor is held in inoperative position by engagement of a rod 121 affixed to the contactor 118 and projecting laterally therefrom with one end of an annular slot 122 formed in the contactor 119. When the handle 105 of the acknowledging device is manually operated the contactor 119 rotates away from the rod 121 and releases the contactor 118 for rotation under the influence of its spiral spring 117. The rotation of the contactor 118 is governed by a clock-work mechanism 120, schematically indicated in Fig. 10, so that it proceeds evenly and at a lower rate than the normal manual rotation of the contactor 119. The surface of contactors 118 and 119 are of insulation except for insulated strip contacts y2 and y1 respectively. These strip contacts y2 and y1 are so positioned in respect to the stationary contacts 12, 13, 140 and 150 that electric connection between contacts 12 and 13 and between contacts 140 and 150 respectively is normally broken. When the handle 105 is moved to its operated position the strip contact y1 bridges contacts 140 and 150. At the same time contactor 118 being released starts to rotate. Shortly after the commencement of this rotation the strip contact of y2 bridges contacts 12 and 13 as shown in Fig. 10b. However, after a certain time lapse the strip contact y2 leaves contact 13 and the breaking of contacts 12 and 13 is again effected. It is thus only in an intermediate position of contactor 118 that the series bridging of contacts 12, 13, 140 and 150 is brought about. The length of time that this continues is governed by the clockwork 120 and is at the option of the road adopting this system. It should be noted that contacts 12 and 13, and 140 and 150 are both normally open; and that on completion of rotation of contactor 118 contacts 12 and 13 are open; further that contacts 140 and 150 are only made on complete manual movement of the handle 105. This arrangement nullifies the effect of operating the acknowledging device in the event of failure for any reason of the contactor 118 to move and serves as a further check in preventing intended operation by tying down the handle.

The centrifugal governor M1 in Fig. 6 has attached to its movable head a cylindrical circuit breaker 135, the right hand surface of which is of insulation 134 and the left hand surface of conductive material 133. Three brushes 130, 131 and 132 are provided for cooperation with the circuit breaker 135. Brush 130 is connected with the plus of battery H; brush 131 is a high speed brush in the circuit of the coil 20 of the vent valve V; and brush 132 is a low speed brush in the forestalling and resetting circuits of the stick relay R. On movement to the left of the circuit breaker 135 by the speed governor M' the insulation 134 first reaches the low speed brush 132 and then the high speed brush 131. The speeds at which the circuits controlled by these brushes are thus broken are matters of adjustment to suit the requirements of the road adopting the system.

On examination of Fig. 6 it will be apparent that the circuit of the coil 20 of the vent valve V differs from that in Figs. 1 and 2 in substituting the brush contacts 130 and 131 for the acknowledging device contacts 14 and 15. Thus the opening of this circuit is controlled not only from the track by contactor A, but also by the speed of the vehicle.

The forestalling and resetting circuits in Fig. 6 are as follows: plus of battery H, brush 130, cylinder contact material 133, brush 132, contacts 103, 101 and 103', contacts 150, $y1$, 140, 13, $y2$ and 12, contacts 11, 3 and 10 for forestalling and 9, 3 and 8 for resetting, coil of relay R, to negative battery.

It is thought that with the above explanation of the changes in Fig. 6 from the modifications previously described the general operation of the construction and arrangement will be readily understood without a detailed description. In brief in the absence of an application impulse from the track the brakes are automatically applied by the breaking of contact 131 whenever a predetermined high speed is exceeded and the brakes so applied may be released when the train has been brought down to its predetermined high speed. If, however, the train passes an active application track element when going above the predetermined high speed the circuit of the coil 20 of the vent valve V is also opened at contact 4 and releasing of the brakes is not possible until the control parts have been reset. If on passing an active application track element the train is traveling below its predetermined high speed it will receive automatic braking unless forestalled by operation of the acknowledging device or by predetermined manual application of the brakes as the case may be. As the acknowledging device is only effective for a predetermined period it must be operated at a time to render its effectiveness coincident with the breaking of contact 7, but due to the fact that the low speed brush 132 is in the forestalling circuit it will be apparent that forestalling by means of the acknowledging device can only take place if the speed of the train on passing the active track element is no higher than that represented by this brush. It will be apparent likewise that resetting cannot be effected by the acknowledging device unless the speed of the train is no higher than that represented by this brush.

In Fig. 7 the centrifugal governor M1 of Fig. 6 with its circuit breaker, battery brush, high speed brush and low speed brush are shown, but the circuit of the coil 20 of the valve V includes in series with the brushes 130 and 131 the acknowledging device contacts 14 and 15. In other words the circuit of the coil 20 in Fig. 7 is the same as in Figs. 1 and 2 except for interposition therein of the high speed brush 131, the bridging contact 133 and battery contact 130. The forestalling and resetting circuits of Fig. 7 are the same as in Figs. 1 and 2 except that the low speed brush 132 is in parallel with the forestalling contact 10' and the resetting contact 9'. Thus if the speed of the train is below that predetermined by the low speed contact brush 132 forestalling and resetting can be effected independently of the contacts 10' and 9'.

A simplified acknowledging device F3 is shown in Fig. 7 comprising merely a button or bridging contact 123 normally spring-retained across contact 14 and 15. When this is pressed down it breaks contacts 14 and 15 and makes contact 12 and 13.

A pendulum device P in Fig. 7 replaces the sylphon-operated contactor B or B' in previous figures and comprises a weight 125 adjustably supported on its pendulum arm which latter is normally retained against contact 10' by an adjustable spring 126. The pendulum arm is of conductive material connected with the positive pole of the battery H. This pendulum gives the measure of the rate of deceleration and consequently of the amount of braking required to break forestalling contact 10' and to make reset contact 9', matters for determination by suitable adjustment to suit the requirements of the road adopting the system. The suggestion is made for the purposes of illustration that contact 10' be broken at the commencement of automatic braking and that contact 9' be made on full service braking. In such event assuming the speed to be above that determined by brush 132 forestalling by means of the acknowledging device F3 will have to be effected prior to the oncoming of the automatic brakes and resetting cannot be effected until a full service application has been made. This action would, of course, be modified in the event that the service reduction valve G of Fig. 2 were employed in connection with this system, but that is a matter readily understood from the foregoing discussion of Fig. 2.

It will be seen that by variations or omissions in the circuits controlled by the sylphon contactor, the speed governor and the acknowledging device, any degree of restriction may be put upon the engineer in the exercise of functions of forestalling and resetting. Further, it should be noted that in the preferential forms, as illustrated in Figs. 1, 2, 3, 4, 5, 7, 8, 8a, 8b and 9, not only is it impossible to have the circuit of the brake applying vent valve closed while that of the initiating relay restoring circuit is closed and maintained so, but the vent valve circuit is always opened as a preliminary to the closing of the relay restoring circuit, and the latter must then be broken and the vent valve closed to make possible the forestalling of actual automatic braking or manual release of brakes after automatic action; also, that no time lag element enters into the operation of these two controlling circuits, and there is no automatic opening of a circuit which has previously been manually closed.

In order to explain the nature of the invention and the functions and modes of operation of the means constituting this invention there have been shown and described several typical embodiments thereof. These have been selected to facilitate explanation of the invention rather than for the purpose of illustrating the specific structure and arrangement of parts necessarily employed in practice, and it should be understood that various adaptations, modifications and additions may be made without departing from the invention. As a pertinent illustration of modifications for example in the pneumatic equipments illustrated in Figs. 1 and 2 referred to above, although not gone into in detail, it may be desired to effect automatic braking by automatically moving the engineer's valve to a braking position and to brake the train solely through the agency of the engineer's valve. In such event it will be apparent that the pilot valve 61 may be omitted. Certain terminology common in the art has been above employed, such as "train", "vehicle", "engineer". Clearly these terms are not used in a limiting sense. Whether the invention is applied to a single vehicle or has its functions effective on a plurality of vehicles is immaterial and the person controlling these functions is independent of the name by which he is designated. "Main reservoir air" has been illustrated as applied to certain features in the suggested pneumatic equipment. A broader term, for example, "controlling air pressure" might have been employed. Such a controlling air pressure for example is now being employed on "trains" comprising one or more vehicles electrically propelled from power generated by gas engines. A few modifications in electrical equipment have been illustrated and it is not thought necessary to give further examples. From the foregoing it should be understood that no undue limitation should be deduced from the specific forms of my invention illustrated by that the appended claims should be construed as broadly as possible in view of the prior art.

What I claim as new and desire to secure by Letters Patent is:

1. In a train control system of the intermittent inductive type, the combination of vehicle-carried means and trackway devices, the vehicle-carried means comprising normally inactive brake-setting means which, when active, cause an automatic application of the brakes, actuation of the brake-setting means being initiated by an inductive impulse received from the track; an acknowledging device on the vehicle to prevent actuation of the brake-setting means on reception of the track impulse provided the device is operated prior to the actuation of the brake-setting means, the acknowledging device permitting restoration of the brake-setting means, after their actuation, only if a predetermined amount of braking has taken place.

2. In a train control system, the combination of car-carried apparatus including brake-applying means comprising an engineer's brake valve, and brake-setting means which when active cause movement of the engineer's brake valve, a manually operable device which when moved from its normal to its operated position permits prevention of the actuation of the brake-setting means and the movement of the engineer's brake valve provided the brake-setting means have not been actuated and the brake valve not moved, this same device when moved into the same operated position permitting restoration of the brake-setting means after their actuation only if a predetermined amount of braking has taken place.

3. In a train control system, the combination of car-carried apparatus including brake-applying means comprising an engineer's brake valve, and brake-setting means which when active cause movement of the engineer's brake valve to a non-charging position, a manually operable device which when moved from its normal to its operated position permits prevention of the actuation of the brake-setting means and the movement of the engineer's brake valve provided the brake-setting means have not been actuated and the brake valve not moved, this same device when moved into the same operated position permitting restoration of the brake-setting means after their actuation only if a predetermined amount of braking has taken place.

4. In a system for automatic train control, the combination of train-carried equipment comprising brake-applying means, two air-operated contacts, one normally closed and the other normally open, it being possible to close only one of the two contacts at a time, and a combined forestalling and resetting device, said device permitting, by identical manual operation of same, the prevention of an automatic application of the brakes provided the closed air contact remains closed, and release of an automatic brake application provided the open contact has been closed.

5. In an intermittent inductive train control system of the permissive type, the combination of trackway devices located along the track and influencing, inductively through an air gap, car-carried apparatus in case of danger condition, car-carried apparatus comprising brake-applying means, including an engineer's valve, said valve being forcibly moved if an impulse is received from the track to cause an automatic application of the brakes, an air-pressure operated contactor having two contacting positions and an intermediate non-contacting zone, a manually operable device ineffective when the air-operated contactor is in an intermediate non-contacting position and permitting prevention of an automatic application of the brakes on receipt of impulse from the track if operated while the contactor is in one of its contacting positions, operation of said manual device also permitting a manual release of the brakes after an automatic application of same provided the contactor is in its other contacting position.

6. In a vehicle equipped with the usual air brake system, the combination of train control apparatus comprising brake-setting means and a governing pressure for the same, an air-operated contactor having two contacting positions and controlling pressure for same, the brake-setting means being actuated by a change in said governing pressure, a manually operable device to allow prevention of an automatic brake application, such prevention being possible only if the brake-setting means has remained inactive and no change has occurred in the controlling pressure of the air-operated contactor and it is in one of its contacting positions, the manually operable device also permitting a release of the brakes provided a predetermined change in the controlling pressure of the air-operated contactor has taken place and it is in its other contacting position.

7. In an automatic train control system, train-carried apparatus comprising a source of energy, a normally energized electro-responsive device, pneumatically-operated contacts and an acknowledging device, said acknowledging device having a normal and an operated position, brake applying means active only when the electro-responsive device is deenergized, two restoring circuits to re-energize the electro-responsive device, one having a normally closed and the other a normally open pneumatically-operated contact, each restoring circuit being effective only if its respective pneumatically-operated contact is closed and the acknowledging device is operated, it not being possible to maintain said acknowledging device in the operated position without causing an application of the brakes.

8. In an automatic train control system, vehicle-carried equipment including a normally energized electro-responsive device and brake-setting means governed by same, brake-applying means including the usual engineer's brake valve, the electro-responsive device having a plurality of restoring circuits including fluid-operated contacts, a combined forestalling and resetting device which, when brought to its operated position, permits reenergization of the electro-responsive device through one of its restoring circuits provided that the engineer's brake valve has not been moved, and when brought to the same operated position after an automatic brake application permits reenergization of the electro-responsive device through another restoring circuit provided the fluid-operated contacts in this restoring circuit are closed.

9. In a train control system, train-carried means comprising an electro-responsive device normally energized, and including a maintaining circuit and restoring circuits, said maintaining circuit including a contactor which when operated causes deenergization of the electro-responsive device, reenergization of said device being possible only through one of its restoring circuits, one of the restoring circuits having a normally open manually operated contact and a normally closed air-operated contact, and the other restoring circuit having a normally open manual contact and a normally open air-operated contact, each restoring circuit being effective only if its manually operated contact and its air-operated contact are simultaneously closed.

10. In an automatic train control system, the combination of trackway devices located along the track, and vehicle-carried means influenced by the trackway devices in case of dangerous traffic conditions, the vehicle-carried means comprising a normally energized electro-responsive device having a maintaining circuit which includes a contactor actuated when passing a danger track element and opening the maintaining circuit, thereby causing deenergization of the electro-responsive device, a restoring circuit for the electro-responsive device comprising a normally open pneumatically-operated contact, and a manually operable device having a normally open contact in the circuit of the restoring circuit, and another normally closed contact in the circuit of another electro-responsive device, said normally closed contact being opened when the normally open contact is closed, reenergization of the first electro-responsive device being possible only if the pneumatically-operated contact and the normally open contact of the manually operable device are simultaneously closed.

11. In an automatic train control system, car-carried equipment comprising brake-applying means, an electro-responsive device normally energized and an acknowledging device, the electro-responsive device when deenergized causing an automatic application of the brakes, reenergization of the electro-responsive device being possible through one of two restoring circuits, both restoring circuits including speed operated, air-operated and manually operated contacts, said manually operated contacts being closed when the acknowledging device is operated, one of the restoring circuits being effective only before a brake application has been initiated and the other restoring circuit only after a brake application has taken effect.

12. In an automatic train control system, car-carried apparatus comprising means to apply the brakes automatically, an air-pressure operated contactor having two contacting positions, a speed controlled contact, and a manually operated device which permits prevention of an automatic application of the brakes provided the air-pressure operated contactor is in one of its contacting positions and the speed controlled contact is closed, and also permits release of the brakes after an automatic application provided the air-pressure operated contactor is in its other contacting position.

13. In an automatic train control system, car-carried apparatus comprising means to apply the brakes automatically, an air-pressure operated contactor having two contacting positions, a speed controlled contact, and a manually operated device which permits prevention of an automatic application of the brakes provided the air-pressure operated contactor is in one of its contacting positions and the speed controlled contact is closed, and also permits release of the brakes after an automatic application provided the air-pressure operated contactor is in its other contacting position, and the speed controlled contact is closed.

14. In an automatic train control system, vehicle-carried equipment including an electro-responsive device governing a second electro-responsive device, both devices normally energized, a normally closed air-operated contactor, and a restoring circuit capable of reenergizing the first electro-responsive device provided the second electro-responsive device is deenergized and the air-operated contactor remains closed.

15. In an automatic train control system, vehicle-carried equipment including an electro-responsive device governing a second electro-responsive device, both devices normally energized, an acknowledging device, a normally closed pressure-operated contactor, and a restoring circuit capable of reenergizing the first electro-responsive device provided the second electro-responsive device is deenergized and the acknowledging device is operated while the air-operated contactor is in a closed position.

16. In an automatic train control system, vehicle-carried equipment including a controlling pressure, and a pressure-operated contactor, said contactor assuming a contacting position in case a predetermined reduction of the controlling pressure is made, a normally energized electro-responsive device governing a second electro-responsive device, a restoring circuit for reenergizing the first electro-responsive device effective only if the second electro-responsive device is deenergized, such reenergization being possible if the pressure-operated contactor is in its contacting position due to a predetermined reduction of the controlling pressure.

17. In an automatic train control system, train-carried apparatus comprising a normally energized electro-responsive device, an acknowledging device having a normal and an operated position, brake-applying means normally inactive and active when the electro-responsive device is deenergized, and two restoring circuits to reenergize the electro-responsive device, both having pneumatically operated contacts, each restoring circuit being effective only if a second electro-responsive device controlled by the first electro-responsive device is deenergized, said second electro-responsive device having contacts in its maintaining circuit which are broken when the acknowledging device is moved into operated position.

18. In an automatic train control system, train-carried equipment comprising brake-controlling means and brake-applying means, including a governing pressure, two air-operated contacts, one normally closed and the other normally open, an acknowledging device, and a normally energized electro-responsive device which, when deenergized, initiates automatic actuation of the brake-controlling means and the brake-applying means, such automatic actuation causing a predetermined reduction of the governing pressure and a fixed amount of braking, prevention of an automatic application being possible provided the acknowledging device is operated prior to the actuation of the brake-applying means and the closed air contact remains closed, and also permitting release of an automatic application of the brakes after said fixed amount of braking has taken place, said acknowledging device being ineffective to stop an automatic brake application when started before said fixed amount of braking has taken place.

19. In an automatic train control system for railroads, car-carried equipment comprising normally inactive brake-setting and brake-applying means and a governing pressure, a manually operable device, and an air-pressure operated contactor having two contacting positions, the manual device, when operated, permitting prevention of an automatic application of the brakes provided the brake-setting means are in their inactive position and the air-operated contactor is in one of its contacting positions, and permitting restoration of the brakes provided a predetermined amount of reduction of the governing pressure has been effected.

20. In a train control system, car-carried equipment comprising brake-setting and brake-applying means, the brake-applying means including a piston-operated valve and a governing pressure for same, the brake-setting means being normally inactive, and an air-operated contactor having two contacting positions and an intermediate non-contacting zone, and a manually operable device permitting prevention of an automatic application of the brakes provided the brake-setting means are inactive and the air-operated contactor is in one of its contacting positions, and permitting the brake-setting means to be restored to normal after an automatic application has taken place provided the air-operated contactor is in its other contacting position and the governing pressure has been reduced by a predetermined amount.

21. In an automatic train control system for railroads, a normally energized electro-pneumatic device, brake-setting means and an acknowledging device, a pressure operated contactor having two contacting positions, and a controlling valve for same, actuation of the contactor being preventable despite the venting of the governing pressure provided the acknowledging device is operated and the pressure operated contactor is in one of its contacting positions, and restoration of the brake-setting means and the control valve after an automatic brake application being permitted by operating the acknowledging device provided the pressure operated contactor is in its other contacting position.

22. In an automatic train control system, brake-applying means including the usual engineer's brake valve, a movable member surrounded on two sides by normally balanced pressures, a charging valve normally maintaining communication between the two sides of the movable member and a governing pressure for this charging valve, a control pressure, reduction of which causes an application of the brakes, such reduction being initiated by venting of the governing pressure and a consequent movement of the engineer's brake valve, such venting also causing the charging valve to close, simultaneous closing of the charging valve and reduction of the controlling pressure resulting in a movement of the movable member.

23. In a train control system, automatic brake equipment including a charging valve and a contactor moved by a member having normally balanced air pressures on both of its sides, the charging valve being normally open and providing communication between the pressures on both sides of said movable member, an exhaust valve in communication with the pressure on one side of said member of the contactor, and governing pressure for the charging valve the venting of which causes the charging valve to close, the exhaust valve to open and the contactor to be moved by its member.

24. In a train control system, car-carried equipment including brake-applying means and a normally energized electro-responsive device, a circuit for this device including a normally closed contact, said contact being controlled by a movable member having normally balanced pressures on both of its sides, a charging valve normally open and providing communication between both sides of said movable member, a governing pressure for the charging valve, said governing pressure being vented when the electro-responsive device is deenergized, the venting of the governing pressure causing an automatic application of the brakes, a closing of the charging valve and a movement of the movable member, and a manually operable device which may prevent automatic application of the brakes provided it is operated while the pressures on both sides of the movable member are balanced.

25. In a train control system, car-carried apparatus comprising means to apply the brakes automatically, a contactor having two contacting positions, but normally maintained by spring pressure in one of its contacting positions, a manually operable device which permits prevention of an automatic application of the brakes provided the contactor is in its normal contacting position, a governing pressure which causes the contactor to move against the spring pressure following an automatic application of the brakes, said pressure moving the contactor into its second contacting position after a predetermined amount of braking has been obtained, release of the brakes by the manual device being possible after an automatic application if the contactor is in its second contacting position.

26. In a train control system, car-carried apparatus comprising means to apply the brakes automatically, a contactor having two contacting positions, but normally maintained by spring pressure in one of its contacting positions, a manually operable device which permits prevention of an automatic application of the brakes provided the contactor is in its normal contacting position, a governing pressure which causes the contactor to move against the spring pressure following an automatic application of the brakes, said pressure moving the contactor into its second contacting position after it has increased to a predetermined value, release of the brakes by the manual device being possible after an automatic application if the contactor is in its second contacting position.

27. In an automatic train control system, car-carried equipment comprising brake-applying means and an electro-responsive device governing the same, a contactor having contacting and non-contacting positions and when in any of its contacting positions closing circuits for the electro-responsive device, said contactor having a movable member the position of which determines the position of the contactor, governing pressure on one side and a spring combination on the other side of the movable member so balanced that the contactor will normally be in one of its contacting positions, and in another contacting position provided a predetermined brake application has taken place.

28. In an automatic train control system, comprising electro-responsive devices and electric circuits, a speed controlled contactor and a manually operable device, said device having a normal and an operated position and comprising a rotatable contactor and stationary contacts, said contactor and contacts being so disposed that the rotatable contactor closes a maintaining circuit in its normal position and closes a restoring circuit in its operated position, said rotatable contactor also opening the restoring circuit in its normal position and the maintaining circuit in its operated position, simultaneous closing of both circuits being impossible in any position of the rotatable contactor, and closing of the restoring circuit being effective only if the speed controlled contactor is in its closed position.

29. In an automatic train control system comprising a normally active relay deenergized when a receiver on the locomotive registers inductively to form a magnetic couple with a traffic controlled element, a brake initiating circuit controlled thereby, and a restoring circuit for said relay including manually operated normally open contacts in series with separate speed and two pressure controlled contacts, of which only one can be closed at a time, said pressure operated contacts being independent of the manually operated contacts.

30. In an automatic train control system comprising a normally active relay deenergized when a receiver on the locomotive registers inductively to form a magnetic couple with a traffic controlled element, a brake initiating circuit controlled thereby, a restoring circuit for said relay including manually operated normally open contacts in series with separate speed and two pressure controlled contacts, of which only one can be closed at a time and means for opening the brake initiating circuit when the restoring circuit is closed.

31. In an automatic train control system comprising a normally active relay deenergized when a receiver on the locomotive registers inductively to form a magnetic couple with a traffic controlled element, a brake initiating circuit controlled thereby, a restoring circuit for said relay including manually operated normally open contacts in series with a speed controlled contact and a normally closed pressure controlled contact and with other normally open contacts controlled by the brake initiating circuit, and means for opening the brake initiating circuit when the restoring circuit is closed.

In testimony whereof I have hereunto signed my name: New York, N. Y., April 11th, 1927.

FRANK J. SPRAGUE.